United States Patent
Maniatis et al.

(10) Patent No.: US 9,331,824 B2
(45) Date of Patent: May 3, 2016

(54) SCHEDULING A TRANSMISSION OF DATA

(75) Inventors: Ioannis Maniatis, Unterensingen (DE); Hans Kroener, Geislingen-Weiler (DE)

(73) Assignee: Nokia Solutions and Networks Oy, Espoo (FI)

(*) Notice: Subject to any disclaimer, the term of this patent is extended or adjusted under 35 U.S.C. 154(b) by 62 days.

(21) Appl. No.: 14/359,954

(22) PCT Filed: Nov. 23, 2011

(86) PCT No.: PCT/EP2011/070822
§ 371 (c)(1),
(2), (4) Date: May 22, 2014

(87) PCT Pub. No.: WO2013/075742
PCT Pub. Date: May 30, 2013

(65) Prior Publication Data
US 2014/0293952 A1 Oct. 2, 2014

(51) Int. Cl.
*H04W 4/00* (2009.01)
*H04L 5/00* (2006.01)
*H04W 72/12* (2009.01)

(52) U.S. Cl.
CPC ......... *H04L 5/0001* (2013.01); *H04W 72/1226* (2013.01)

(58) Field of Classification Search
CPC ...................................................... H04W 4/00
USPC .................................................. 370/280–339
See application file for complete search history.

(56) References Cited

U.S. PATENT DOCUMENTS

| | | | |
|---|---|---|---|
| 2003/0108005 A1 | 6/2003 | Agrawal et al. | 370/329 |
| 2011/0081865 A1 | 4/2011 | Xiao et al. | 455/63.1 |
| 2012/0195286 A1* | 8/2012 | Kim | H04L 5/0048 370/330 |

OTHER PUBLICATIONS

Texas Instruments (3GPP TSG RAN WG1 Meeting#61bis, R1-103713, Views on PDCCH Interference Mitigation for Het-Nets, Jul. 2, 2010).*
CATT (3GPP TSG RAN WG1 Meeting#62bis, R1-105184, Performance Analysis in Macro-Pico with RE, Oct. 2010).*
3GPP TSG RAN WG1 #62; "HeNB Power Control and Radio Link Monitoring Aspects"; Aug. 23-27, 2010; Madrid, Spain; R1-104484; 10 pgs.
3GPP TSG RAN WG1 Meeting #62bis; "Performance Analysis in Macro-Pico with RE"; Oct. 11-15, 2010; Xi'an, China; R1-105184; 6 pgs.
3GPP TSG RAN WG1 #61bis; "Views on PDCCH Interference Mitigation for Het-Nets"; Jun. 28-Jul. 2, 2010; Dresden, Germany; R1-103713; 11 pgs.

* cited by examiner

*Primary Examiner* — Iqbal Zaidi
(74) *Attorney, Agent, or Firm* — Harrington & Smith

(57) ABSTRACT

Transmission of data is scheduled via a first communication channel within a first cell of a cellular network. A first base station is assigned to the first cell. A user equipment is served by the first base station, and the first communication channel is divided into subframes. The cellular network includes a second base station assigned to a second cell, wherein the second base station uses a second communication channel divided into subframes, and a part of the subframes is unscheduled by the second base station due to a predefined muting pattern. The first base station determines a first subframes of the first communication channel related in time with the unscheduled subframes of the second communication channel, and schedules transmission of data between the first base station and the user equipment via the first communication channel so that the data is transmitted in the determined first subframes.

20 Claims, 3 Drawing Sheets

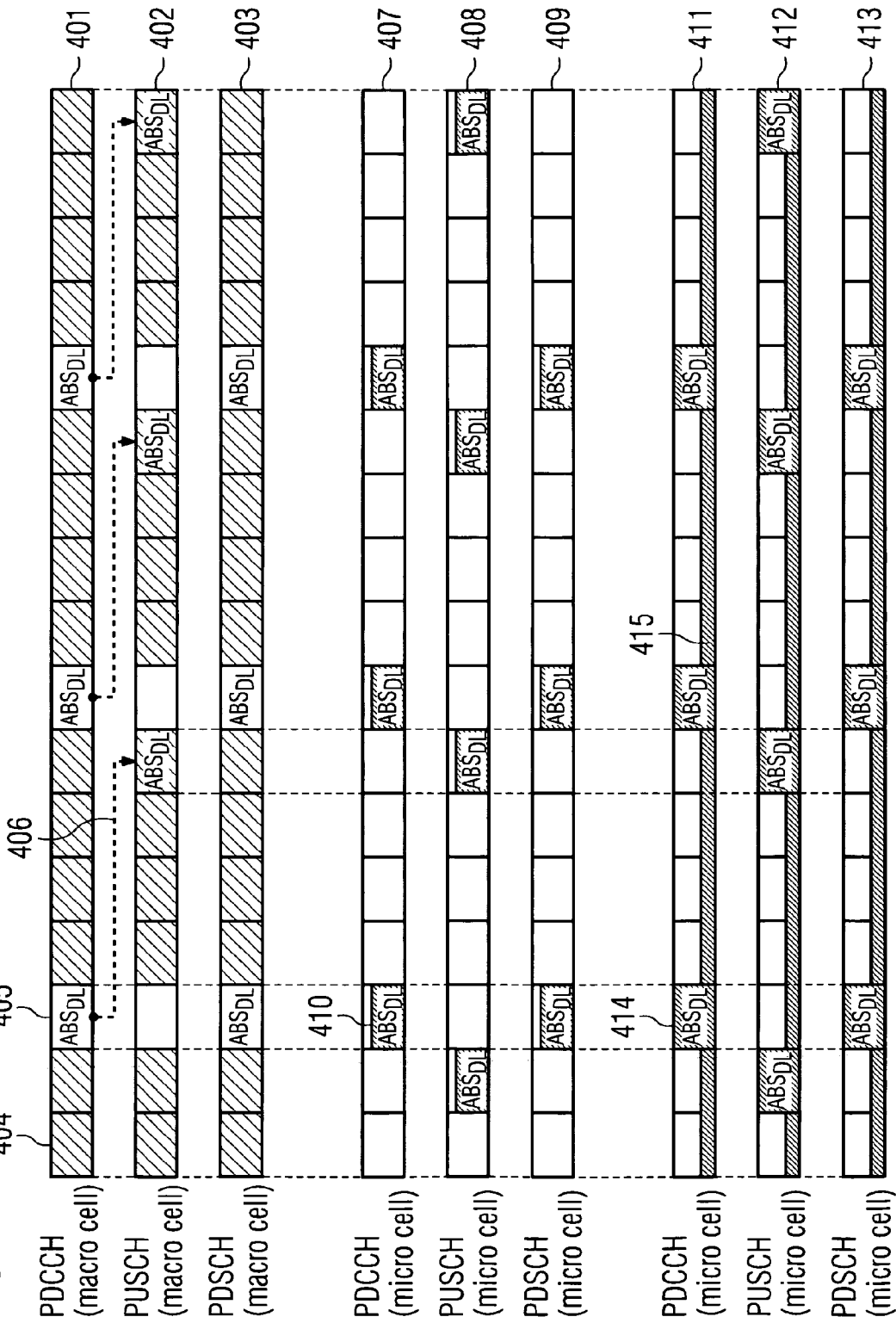

SCHEDULING A TRANSMISSION OF DATA

FIELD OF INVENTION

The present invention relates to the field of cellular networks and in particular to cellular networks using a muting pattern.

ART BACKGROUND

In current 3GPP specifications, time domain (TD) enhanced inter-cell interference coordination (eICIC) has been introduced. The eICIC concept is introducing coordination mechanisms such that it is possible to reduce the interference from an aggressor cell, in particular a macro cell, to a victim cell, in particular a micro or pico cell.

The TD eICIC is mainly designed to address downlink interference challenges, but also has some undesirable effects on uplink performance.

More specifically, Time Domain Enhanced Intercell Interference Coordination (TD-eICIC) has been specified. TD-eICIC can be used in heterogeneous networks (HetNets), which consist of different sized cells, typically one macro cell and several micro/pico cells deployed within the coverage area of the macro cell. HetNets provide means to increase overall data throughput for UEs in the respective coverage area by shifting UEs with bad coverage in the outer range of the macro cell to smaller cells which are typically lower loaded. TD-eICIC is then used to control the interference induced from the macro to the micro/pico cells and vice versa.

In a HetNet, intercell interferences may be induced to the micro/pico cell by the transmissions in the macro cell. TD-eICIC is introduced in order to alleviate the intercell interference within HetNets using same carrier frequency by introducing periods of silence for the eNodeB serving the macro cell. These periods of silence are realized by partially muting several subframes of the macro cell, during which only specific control signaling but no data is allowed for transmission. A partially muted subframe is termed Almost Blank Subframe (ABS). Summarizing, during an ABS in the macro cell, no downlink (DL) resource allocations occur, and also no uplink (UL) grants. Only some control signals, i.e. only essential information (such as information vital to the operation of the system, for instance reference symbols, synchronization sequences, broadcast channels, system information, paging, etc.) are allowed for transmission mainly to maintain normal operation of Rel8 and Rel9 UEs in the cell.

In addition to the application of ABSs, the UE in the outer range of the macro cell can be handed over sooner to the micro/pico cell by extending the cell range of the latter cell, as specified by 3GPP. The thought behind this is that said UE will experience better coverage conditions due to the nearby eNodeB serving the micro/pico cell, as compared to the further away eNodeB serving the macro cell. Also, the traffic load of the macro cell is reduced by offloading parts of it to the lower loaded micro/pico cell. This can also result in an increased amount of resources assigned to the UE increasing its overall data through-put.

There may be a need for a system and method, which take into account the muting pattern of the macro cell when scheduling a data transmission in the micro or pico cell.

SUMMARY OF THE INVENTION

This need may be met by the subject matter according to the independent claims. Advantageous embodiments of the present invention are described by the dependent claims.

According to a first aspect of the invention there is provided a method for scheduling a transmission of data via a first communication channel within a first cell of a cellular network, wherein a first base station is assigned to the first cell, and wherein a user equipment is served by the first base station, wherein data between the first base station and the user equipment is transmittable using the first communication channel, wherein the first communication channel is divided into subframes, wherein the cellular network comprises a second base station being assigned to a second cell, wherein the second base station is adapted to use a second communication channel, wherein the second communication channel is divided into subframes, and wherein a part of the subframes is unscheduled by the second base station due to a predefined muting pattern. The method comprises determining, by the first base station, a first plurality of the subframes of the first communication channel being related in time with the unscheduled subframes of the second communication channel, and scheduling, by the first base station, the transmission of data between the first base station and the user equipment via the first communication channel so that the data is transmitted in the determined first plurality of the subframes.

This aspect of the invention is based on the idea to consider the muting pattern of the second cell when scheduling the transmission of data via a communication channel of the first cell. In the muted, or more specific partial muted (as there may be some essential information (such as information vital to the operation of the system, for instance reference symbols, synchronization sequences, broadcast channels, etc)) or unscheduled sub-frames, the interferences at the first cell are lower for the user equipment (UE) than in the scheduled subframes. Thus, the method may use this information to potentially boost the UL (uplink) capacity and transmission rates by introducing awareness of muting patterns in the first cell.

The method refers to the context of LTE Advanced and more specifically to Time Domain Enhanced Intercell Interference Coordination (TD-eICIC) specified in LTE Rel-10. TD-eICIC might be used in heterogeneous networks (HetNets), which consist of different sized cells, typically one macro cell and several micro/pico cells deployed within the coverage area of the macro cell. HetNets provide means to increase overall data throughput for UEs in the respective coverage area by shifting UEs with bad coverage in the outer range of the macro cell to smaller cells which are typically lower loaded. TD-eICIC is then used to control the interference induced from the macro to the micro/pico cells and vice versa.

Transmissions in the second cell, for instance a macro cell, might induce a great deal of intercell interference to the first cell, for instance a micro or pico cell. TD-eICIC might be introduced in order to alleviate the intercell interference, for instance within HetNets, using same carrier frequency by introducing periods of silence for the eNodeB serving the macro cell. These periods of silence are realized by partially muting several subframes of the macro cell, during which only specific control signaling but no data is allowed for transmission. A partially muted subframe is termed Almost Blank Subframe (ABS). During an ABS in the macro cell, no DL resource allocations occur and thus also no UL grants. Only some control signals (for instance system information, paging, etc.) are allowed for transmission mainly to maintain normal operation of Rel8 and Rel9 UEs in the cell.

According to the first aspect of the invention, the ABSs in the second cell may be considered when scheduling the traffic, i.e. the data transmission, in the first cell. In particular, the data transmission may be concentrated in subframes related to the ABSs of the second cell. By using this method, also the micro-to-macro (first to second cell) intercell interference may be decreased, which benefits the macro cell UEs close to the coverage area of the micro cell. Thus, the described method may handle a scheduling approach for uplink (UL) and downlink (DL) based on TD-eICIC, which considers the reduced intercell interference levels and schedules respective resources to the UEs.

The term "base station" in this context may denote any kind of physical entity being able to hold one or more cells. A base station in this context may be any kind of network device providing the required functionality for the described method; it may also be a transceiver node in communication with a centralized entity. According to the first aspect, the first base station and the second base station may be any kind of network devices each being responsible for a communication with their cell, i.e. two different cells that are located at two different locations.

In the following, the term "macro cell" will be used for the second cell without limiting the type of the second cell. The term "micro cell" will be used for the first cell without limiting the type of the first cell.

The term "data" may denote any kind of data packet comprising for example control information or payload information.

The term "scheduling" may denote any kind of planning of transmission of data. For instance, it may denote planning of traffic in relation to subframes of a communication channel, i.e. which subframes may be used for a transmission.

The term "being related in time" may denote any kind of relation between subframes of the first communication channel and the second communication channel. The relation may be equal in time or shifted in time.

According to an embodiment of the invention, the first communication channel and the second communication channel are at least partially interfering. As described above, the second cell may introduce interferences to the first cell, or more detailed to the communication channel. For instance, in the Pico/Micro-Macro case, the coverage area of the pico or micro cell (victim cell, i.e. the first cell) may be extended. The pico/micro cell (i.e. the eNodeB controlling the cell) configures each own range extension using respective handover settings, which are then signaled to the UEs.

In the case when the macro cell is heavy loaded, in order to alleviate the traffic load, UEs might be offloaded to small cells (micro/pico) within the coverage range of the macro cell. If wanted, in order to offload the UEs sooner, the range of the small cell may be extended (for instance via handover settings modification). In order to protect offloaded UEs served now by the small cell and located in the range extension area of the small cell, TD-eICIC (i.e. muted subframes (ABS)) may be introduced.

Therefore, the range extension may depend on how soon the UEs should be offloaded to the small cell. The higher the range extension is chosen, more UEs start to be offloaded sooner to the small cell. However, also the intercell interference these UEs experience will be higher since these UEs are located closer to the macro cell as compared to no range extension applied. The more UEs are offloaded, the more ABS might be needed in the macro cell Normally, the aggressor cell may apply muting on specific subframes in the time domain so as to reduce the interference detected by users in the victim cell. When applying downlink TD muting patterns, only essential information (such as information vital to the operation of the system, for instance reference symbols, synchronization sequences, broadcast channels, etc) is conveyed from the aggressor cell. This means that the aggressor cell is not allowed to transmit any information that is related to UE specific behavior in the downlink direction. During the un-muted subframes, or scheduled subframes, of the second cell or second communication channel, the interferences at the first cell or the first communication channel may be high. During the muted subframes, or unscheduled subframes, of the second cell or second communication channel, the interferences at the first cell or the first communication channel may be low, as the second base station is not able to schedule UL traffic due to ABS.

According to a further embodiment of the invention, the first communication channel and the second communication channel each comprise a control channel and an uplink channel, the control channel being assigned to downlink communication for allocating uplink communication in the uplink channel, wherein the subframes of the control channel and the corresponding subframes of the uplink channel are shifted in time.

The control channel may be for instance a physical control channel as specified in LTE. The uplink channel may be a physical uplink shared channel as specified in LTE. The control channel may allocate resources in the uplink channel for transmission for a user equipment.

According to a further embodiment of the invention, determining the first plurality of the subframes comprises determining a first amount of the first plurality of the subframes being related to the control channel of the first communication channel and a second amount of the first plurality of the subframes being related to the uplink channel of the first communication channel.

ABSs of the second communication channel associated to the control channel correspond to specific subframes of the control channel of the first communication channel. Also, ABSs of the second communication channel associated to the uplink channel correspond to specific subframes of the uplink channel of the first communication channel.

According to a further embodiment of the invention, the first communication channel and the second communication channel each comprise a downlink channel being assigned to downlink communication, wherein the unscheduled subframes of the control channel are related in time with the unscheduled subframes of the downlink channel.

The downlink channel may be a physical downlink shared channel as specified in LTE.

According to a further embodiment of the invention, determining the first plurality of the subframes comprises determining a third amount of the first plurality of the subframes being related to the downlink channel of the first communication channel.

The third amount may be equal in time than the first amount.

According to a further embodiment of the invention, scheduling the transmission of data comprises scheduling the transmission of data between the first base station and the user equipment via the first communication channel so that the data is transmitted in the determined third amount of the first plurality of the subframes.

A DL scheduler in the small cell (i.e. the first cell) may schedule the entire PDSCH traffic during subframes corresponding to macro cell subframes $ABS_{DL}$.

According to a further embodiment of the invention, scheduling the transmission of data comprises scheduling the transmission of data between the first base station and the user equipment via the first communication channel so that the data is transmitted in the determined first amount of the first plurality of the subframes and the determined second amount of the first plurality of the subframes.

One consequence of not assigning UL grants on PDCCH during muted subframes in the macro cell is $ABS_{UL}$ (i.e. muted subframes in the uplink channel), which may then be exploited by the scheduler in the small cell.

Scheduling the transmission of data may comprise scheduling the transmission for the control channel as well as for the uplink channel. For example, a scheduler, or more schedulers, being associated with the first base station in the first cell may thus apply the following approach. An UL scheduler may assign the UL grants during macro cell subframes $ABS_{DL}$, thus scheduling the entire PUSCH traffic during subframes corresponding to the macro cell subframes $ABS_{UL}=ABS_{DL}$+offset (4 subframes in the case of FDD).

An UL grant may be assigned and transmitted during $ABS_{DL}$. This grant points to the UE which resources it may use for PUSCH transmission during $ABS_{UL}$ four subframes later in the case of FDD.

According to a further embodiment of the invention, the method further comprises determining a quantity of data to be transmitted.

The "quantity of data" may denote the traffic load for the communication channel, i.e. how much traffic exists.

According to a further embodiment of the invention, wherein, if the quantity of the data to be transmitted is below a predefined threshold, the data is transmitted in the first plurality of the subframes, and, if, the quantity of the data to be transmitted is above the predefined threshold, the data is transmitted in the first plurality of the subframes and in a second plurality of the subframes being related in time with scheduled subframes of the second communication channel.

When the traffic load in the micro cell is high and exceeds the capacity of ABSs, then the subframes corresponding or relating to ABSs of the second communication channel may be filled up with data transmission of UEs and the remaining traffic may be offloaded to non-ABSs, i.e. the remaining subframes. Preferably, all data transmission of one UE may be associated with one subframe, wherein also more than one UE may be assigned to one subframe.

According to a further embodiment of the invention, the method further comprises determining a position of a user equipment, wherein, if the position of the user equipment corresponds to a cell range extension, the data corresponding to the user equipment is transmitted with a higher priority in the first plurality of subframes than the data corresponding to a user equipment being positioned not in the cell range extension.

A UE in the outer range of the macro cell can be handed over to the micro cell by extending the cell range of the micro cell as specified by 3GPP. The thought behind this is that said UE will experience better coverage conditions due to the nearby eNodeB serving the micro cell, as compared to the further away eNodeB serving the macro cell. Also, the traffic load of the macro cell may be reduced by offloading parts of it to the lower loaded micro cell. This can also result in an increased amount of resources assigned to the UE increasing its overall data throughput.

According to this embodiment, scheduling may take into account the ABS pattern knowledge from the macro cell as well as the knowledge about whether the UE is located in the cell range extension (CRE) area of the micro cell or not. In the following the term "CRE" UE refers to UE located in the CRE area of the micro cell, and the term "non-CRE" UE refers to UE located outside the CRE area of the micro cell, i.e. in the "normal" area of the micro cell. Thus, "determining the position" may denote determining whether the UE is a CRE or non-CRE UE.

In case of high traffic load exceeding the capacity of ABSs, the traffic may be offloaded to non-ABSs as well. In ABSs, "CRE" UEs may have higher scheduling priority as compared to "non-CRE" UEs. The DL scheduler may schedule "CRE" UEs first with PDSCH traffic during subframes corresponding to macro cell subframes $ABS_{DL}$. If no other "CRE" UEs are left for scheduling and enough resources are still available, then "non-CRE" UEs may be scheduled in ABSs as well. The UL scheduler may schedule "CRE" UEs first with PUSCH traffic during subframes corresponding to the macro cell subframes $ABS_{UL}=ABS_{DL}$+"offset", i.e. it may schedule the corresponding UL grants during subframes corresponding to macro cell subframes $ABS_{DL}$. If no other "CRE" UEs are left for scheduling and enough resources are still available, then "non-CRE" UEs may be scheduled in said subframes as well. When ABSs are filled up with UEs, the scheduling of remaining "non-CRE" UEs may be delayed till the next non-ABS.

According to a further embodiment of the invention, the method further comprises receiving, by the first base station, the predefined muting pattern from the second base station.

This may be performed for example by using an X2 interface offering an information element (IE) to be exchanged from macro (second) to micro (first) cell. This IE provides information about which sub frames the sending eNB is configuring as almost blank subframes and which subset of almost blank subframes are recommended for configuring measurements towards the UE. Almost blank subframes are subframes with reduced power on some physical channels and/or reduced activity. With this information, the first base station may know the exact pattern that the second base station will use for reducing power on some channels (and even potentially not even transmit), providing a basis for the described method.

According to a further embodiment of the invention, configuring the user equipment comprises sending from the base station to the user equipment a signal comprising information about an allocation of resources within the communication channel.

By using such a signal, the UE may know in which resources it should transmit and in which resources it should not transmit. The UE may be scheduled dynamically, by using such a signal, so that for each TTI (transmit time interval), it is informed whether to transmit or not.

According to a second aspect of the invention, there is provided a base station for scheduling a transmission of data via a first communication channel within a first cell of a cellular network, wherein the first base station is assigned to the first cell, and wherein a user equipment is served by the first base station, wherein data between the first base station and the user equipment is transmittable using the first communication channel, wherein the first communication channel is divided into subframes, wherein the cellular network comprises a second base station being assigned to a second cell, wherein the second base station is adapted to use a second communication channel, wherein the second communication channel is divided into subframes, and wherein a part of the subframes is unscheduled by the second base station due to a predefined muting pattern. The base station comprises a determination unit being adapted to determine a first plurality of the subframes of the first communication channel being related in time with the unscheduled subframes of the second communication channel, and a scheduling unit being adapted to schedule the transmission of data between the first base station and the user equipment via the first communication channel so that the data is transmitted in the determined first plurality of the subframes.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting unit, for example a transmitter. The receiver and the transmitter may be implemented as one single unit, for example as a transceiver. The transceiver or the receiving unit and the transmitting unit may be adapted to communicate with the second base station or the user equipment via an antenna.

The determination unit and the scheduling unit may be implemented as single units or may be implemented as one unit providing the functionalities of both units. The units may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may comprise a configuration unit for receiving a configuration signal from the base station informing the user equipment about the scheduling of the communication channel. Such a configuration unit may be adapted to configure the user equipment to transmit in accordance with the planned scheduling of the communication channel. The configuration unit of the user equipment may be implemented for example as part of a control unit, like a CPU or a microcontroller. The configuration unit and the transceiver may be coupled or may be implemented as one single unit.

According to a third aspect of the invention, there is provided a cellular network system, wherein the cellular network system comprises a first cell, wherein a base station as described above is assigned to the first cell.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for scheduling a transmission of data via a first communication channel within a first cell of a cellular network is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of scheduling a transmission of data via a first communication channel within a first cell of a cellular network. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

FIG. 4 shows a timing relation between transmissions in the second cell and transmissions in the first cell, for low traffic and high traffic.

DETAILED DESCRIPTION

Figure 1:
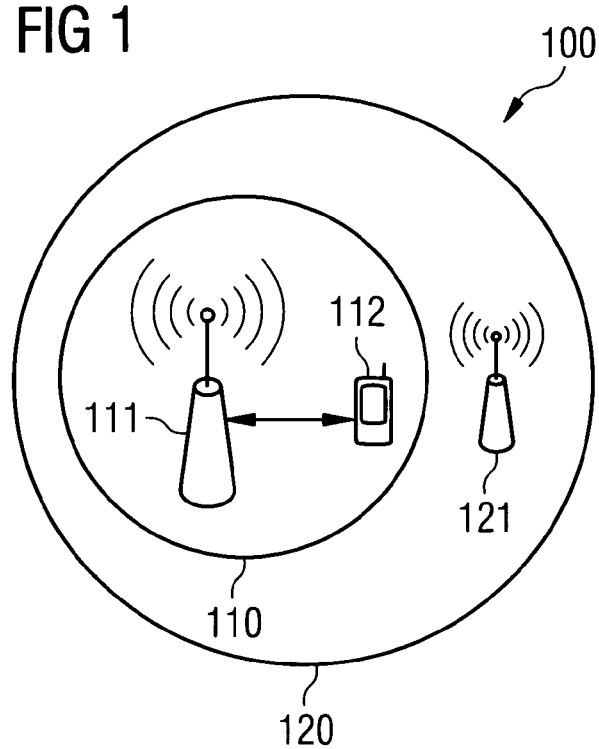
FIG. 1 shows a cellular network system according to an exemplary embodiment of the invention.

The illustration in the drawing is schematically. It is noted that in different figures, similar or identical elements are provided with the same reference signs.

In the following, embodiments of the herein disclosed subject matter are illustrated with reference to the drawings and reference to aspects of current standards, such as LTE. However, such reference to current standards is only exemplary and should not be considered as limiting the scope of the claims.

FIG. 1 shows a first cell 110 of a cellular network system 100. A first base station 111 is assigned to the first cell 110 of the cellular network system and a user equipment 112 being served by the first base station. Signals between the first base station and the user equipment are transmittable using a first communication channel, which is divided into subframes.

The cellular network system 100 comprises a second cell 120, wherein a second base station 121 is assigned to the second cell. The second cell may be at least partially overlapping the first cell. In another embodiment, the first cell and the second cell are neighbored, without any overlap, but with some interference between the cells. In one embodiment, the first cell may be smaller than the second cell and may be for example a micro or pico cell, wherein the second cell may be a macro cell.

The second base station is adapted to use a second communication channel, wherein the second communication channel is divided into subframes. A part of these subframes is unscheduled by the second base station due to a predefined muting pattern.

The first base station determines a first plurality of the subframes of the first communication channel which are related in time with the unscheduled subframes of the second communication channel. Related in time in this context may denote any time relationship between subframes of the first and the second communication channel, for instance equal in time or shifted in time. The first base station then schedules the transmission of data between the first base station and the user equipment via the first communication channel so that the data is transmitted in the determined first plurality of the subframes. This means that the transmission should take place in subframes which corresponds to the muted subframes (ABSs) of the second communication channel.

This network system relates to LTE Advanced and more specifically to Time Domain Enhanced Intercell Interference Coordination (TD-eICIC) specified in LTE Rel-10. TD-eICIC may be used in heterogeneous networks (HetNets), which consist of different sized cells, typically one macro cell and several micro/pico cells deployed within the coverage area of the macro cell. HetNets provide means to increase overall data throughput for UEs in the respective coverage area by shifting UEs with bad coverage in the outer range of the macro cell to smaller cells which are typically lower loaded. TD-eICIC can then be used to control the interference induced from the macro to the micro/pico cells and vice versa.

Figure 2:
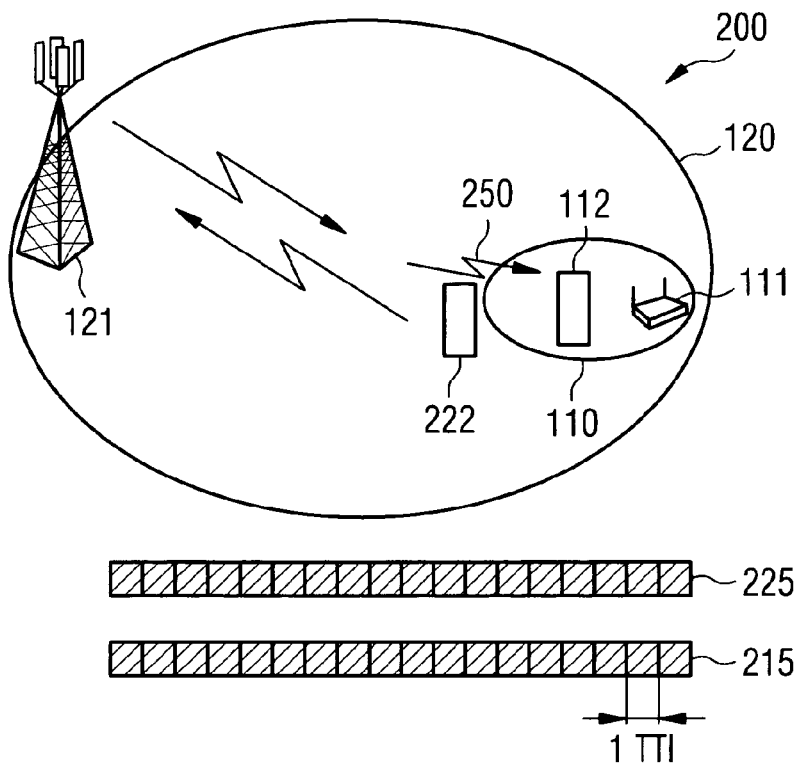
FIG. 2 shows a cellular network system comprising a macro cell and a micro cell.
Figure 3:
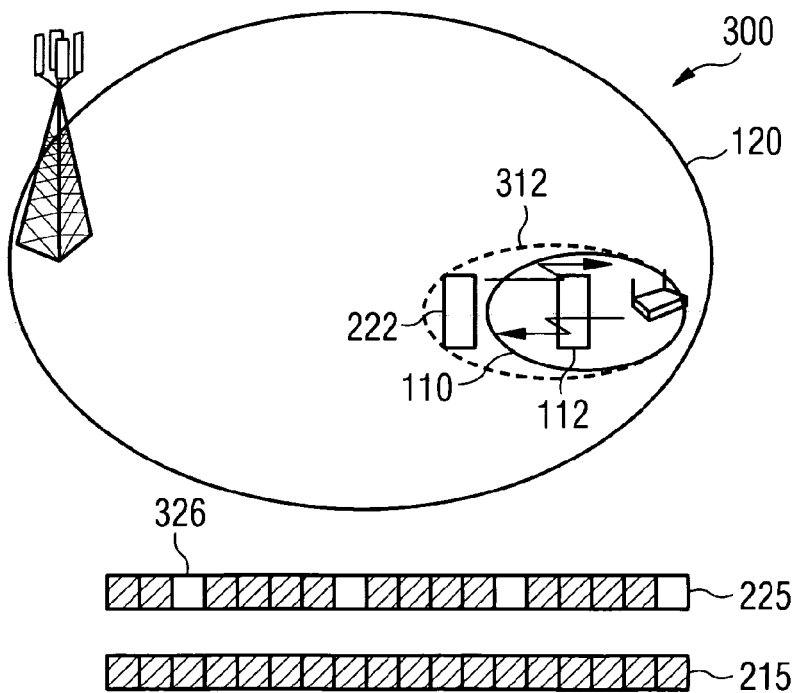
FIG. 3 shows a cellular network system according to a further exemplary embodiment of the invention.

In FIGS. 2 and 3, a HetNet system is shown comprising a first small cell corresponding to the first cell of FIG. 1 and a second greater cell corresponding to the second cell of FIG. 1. A scheduling approach to be used in UL and DL based on TD-eICIC, which considers the reduced intercell interference levels and schedules respective resources to the UEs, will be described in the following.

The considered scenario is illustrated in FIGS. 2 and 3 by the example of one macro 120 and one micro 110 cell. Extension to more than one macro, micro and pico cells is straightforward.

In the HetNet system 200 illustrated in FIG. 2, a great deal of intercell interference 250 is induced to the micro cell by the transmissions in the macro cell. All subframes are used for transmission as indicated by reference signs 215 for the micro cell and 225 for the macro cell.

Referring to FIG. 3, TD-eICIC may be introduced in order to alleviate the intercell interference within HetNets 300 using same carrier frequency by introducing periods of silence 326 for the eNodeB serving the macro cell. These periods of silence are realized by partially muting several subframes of the macro cell, during which only specific control signaling but no data is allowed for transmission. A partially muted subframe is termed Almost Blank Subframe (ABS). Summarizing, during an ABS in the macro cell, no DL resources are allocated, and also no UL granted.

In addition to the application of ABSs, the UE 222 in the outer range of the macro cell can be handed over sooner to the micro cell by extending the cell range 312 of the latter cell, as specified by 3GPP. The thought behind this is that said UE will experience better coverage conditions due to the nearby eNodeB serving the micro cell, as compared to the further away eNodeB serving the macro cell. Also, the traffic load of the macro cell can be reduced by offloading parts of it to the lower loaded micro cell. This can also result in an increased amount of resources assigned to the UE increasing its overall data throughput.

For the scenario of FIG. 3, a scheduling approach might be necessary for the micro cell which will exploit the ABS pattern knowledge from the macro cell as well as the knowledge about whether the UE is located in the cell range extension (CRE) area of the micro cell or not.

In the following the term "CRE" UE refers to UE located in the CRE area of the micro cell, and the term "non-CRE" UE refers to UE located outside the CRE area of the micro cell.

One possible approach is that in the HetNet scenario of FIG. 3 a proportional fair (PF) scheduling principle may be applied. With r(k,t) denoting the throughput supported by UE k at time t and $\overline{R}(k,t)$ denoting the average throughput of UE k until time t, the PF metric $$M_k = \frac{r(k, t)}{\overline{R}(k, t)},$$

can be evaluated by the respective scheduler, which may be implemented in the first base station. UEs with higher PF metric are scheduled first. r(k,t) is calculated based on the CQI value reported by the UE. During macro cell DL transmissions, "non-CRE" UEs in the micro cell will always have a higher SINR, thus higher CQI, thus higher r(k,t) than "CRE" UEs. This will also be the case during an ABS in the macro cell.

However, the difference in SINR, and thus also CQI, experienced during ABSs and non-ABSs will be much higher for "CRE" UEs as compared to "non-CRE" UEs, which will also become visible in $\overline{R}(k, t)$. Therefore, $M_k$ of "CRE" UEs will be higher during ABSs as compared to "non-CRE" UEs. This means that with the current scheduling approach, "CRE" UEs will be scheduled with higher preference during ABSs as compared to "non-CRE" UEs. According to this approach, resources might be assigned to "CRE" UEs during non-ABSs if respective conditions are met.

In the following, a further approach according to an embodiment of the invention will be described, taking into account the overall traffic load in the micro cell and using an overflow principle from ABS to non-ABS in the micro cell, as shown in FIG. 4. This means that when the traffic load in the micro cell is low with the respect to the traffic capacity of ABSs, in DL, all traffic is concentrated in the ABSs, and in UL, all traffic is concentrated in the subframes without PUSCH traffic in the macro cell due to no grant allocation via PDCCH in the ABSs.

This scheduling approach may also decrease the micro-to-macro intercell interference, which benefits the macro cell UEs close to the coverage area of the micro cell. When the traffic load in the micro cell is high and exceeds the capacity of ABSs, then ABSs can be filled up with UEs and the remaining traffic can be offloaded to non-ABSs.

According to 3GPP Rel10 specifications, during ABSs 405, in the macro cell only certain control signaling is allowed for transmission in the cell in order to maintain normal operation of Rel8 and Rel9 UEs. No DL data is transmitted on the PDSCH 403 and no UL grants are assigned to UEs on the PDCCH 401. This means that during specific subframes (404 indicating one subframe) the transmission is almost muted 405. Not assigning any UL grants during subframes $ABS_{DL}$ 405 means that there will be no PUSCH 402 traffic in the macro cell during subframes $ABS_{UL} = ABS_{DL} + 4$. In this example, the offset corresponds to four subframes 406, but it may also be less or more depending on the duplex scheme applied (FDD or TDD). Therefore, macro-to-micro intercell interference is heavily mitigated in the DL and eliminated in the UL.

The schedulers or scheduling unit in the micro cell may then apply the following approach. In case of low traffic load with respect to the traffic capacity of ABSs, all traffic 410 may be scheduled in ABSs only. This means that the subframes of the PDCCH 407, 411, PUSCH 408, 412 and PDSCH 409, 413 are used which correspond to the ABSs of the second communication channel of the macro cell.

The DL scheduler in the micro cell 110 schedules the entire PDSCH traffic during subframes corresponding to macro cell subframes $ABS_{DL}$. The UL scheduler in the micro cell 110 assigns the UL grants during subframes $ABS_{DL}$, thus scheduling the entire PUSCH traffic during subframes corresponding to the macro cell subframes $ABS_{UL} = ABS_{DL} + 4$. Scheduling in non-ABSs might not be allowed in UL and DL.

In case of high traffic load exceeding the capacity of ABSs, traffic will be offloaded 415 to non-ABSs as well, as illustrated in the bottom graph of FIG. 4. In ABSs, "CRE" UEs have higher scheduling priority as compared to "non-CRE" UEs. The DL scheduler in the micro cell 110 schedules "CRE" UEs first with PDSCH traffic during subframes corresponding to macro cell subframes $ABS_{DL}$. If no other "CRE" UEs are left for scheduling and enough resources are still available, then "non-CRE" UEs will be scheduled in ABSs as well.

The UL scheduler in the micro cell 110 schedules "CRE" UEs first with PUSCH traffic during subframes corresponding to the macro cell subframes $ABS_{UL} = ABS_{DL} + 4$, i.e. it will schedule the corresponding UL grants during subframes corresponding to macro cell subframes $ABS_{DL}$. If no other "CRE" UEs are left for scheduling and enough resources are still available, then "non-CRE" UEs will be scheduled in said subframes as well. When ABSs are filled up with UEs, the scheduling of remaining "non-CRE" UEs can be delayed till the next non-ABS.

By using embodiments of the invention, the following advantages can be achieved:

Full use of the alleviated intercell interference scenario provided by TD-eICIC on all channels (PDCCH, PDSCH, PUSCH).

Better UL capacity in the micro cell during subframes without PUSCH traffic in the macro cell.

Better UL and DL capacity in the macro cell if the micro cells handle their traffic primarily in the DL ABSs and UL subframes without PUSCH traffic in the macro.

Exploit daily and location dependent traffic fluctuations to provide optimum resource usage while mitigating intercell interference in HetNet scenarios.

Figure 5:
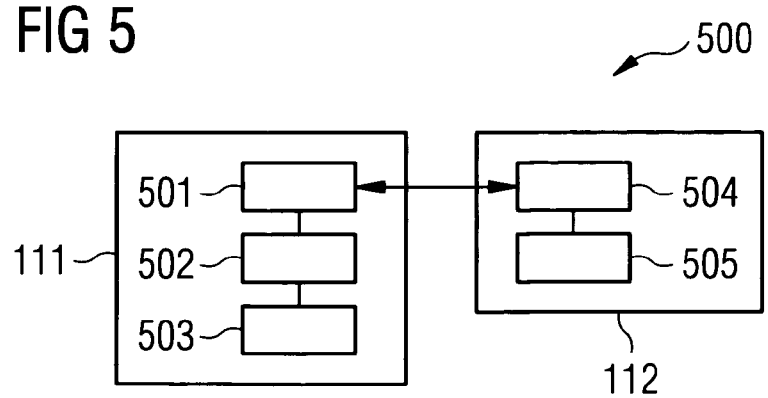
FIG. 5 shows a base station and a user equipment within a cellular network system according to an exemplary embodiment of the invention.

FIG. 5 shows a cellular network system 500 according to an exemplary embodiment of the invention. The cellular network system comprises a base station 111 and a user equipment 112 being served by the base station.

The base station 111 is assigned to a first cell of the cellular network system. Signals between the first base station and the user equipment are transmittable using a first communication channel, wherein the first communication channel is divided into subframes.

The cellular network comprises a second cell (not shown), wherein a second base station (not shown) is assigned to the second cell. The second base station is adapted to use a second communication channel, wherein the second communication channel is divided into subframes, and wherein a part of the subframes is unscheduled by the second base station due to a predefined muting pattern.

The base station 111 comprises a determination unit 502 being adapted to determine a first plurality of the subframes of the first communication channel being related in time with the unscheduled subframes of the second communication channel. The base station comprises further a scheduling unit 503 being adapted to schedule the transmission of data between the first base station and the user equipment via the first communication channel so that the data is transmitted in the determined first plurality of the subframes. The scheduling unit can comprise one or more scheduler, which can be assigned to different subchannels (PUSCH, PDCCH, PDSCH, . . . ).

The base station 111 may be any type of access point or point of attachment, which is capable of providing a wireless access to a telecommunication network. Thereby, the wireless access may be provided for a user equipment 112 or for any other network element, which is capable of communicating in a wireless manner, for instance also the second base station.

The base station comprises a receiver as known by a skilled person. The base station may also comprise a transmitter. The receiver and the transmitter may be implemented as one single unit, for example as a transceiver 501 as shown in FIG. 5. The transceiver or the receiving unit and the transmitter may be adapted to communicate with the second base station (not shown) or the user equipment 112 via an antenna.

The determination unit and the scheduling unit may be implemented for example as part of a standard control unit, like a CPU or a microcontroller, or may be implemented as a single unit.

The user equipment (UE) 112 may be any type of communication end device, which is capable of connecting with the described base station. The UE may be in particular a cellular mobile phone, a Personal Digital Assistant (PDA), a notebook computer, a printer and/or any other movable communication device.

The user equipment may 112 comprise a transmitting unit for transmitting signals to the base station 111. The user equipment further comprises a receiving unit being adapted to receive signals from the first base. The transmitting unit may be a transmitter as known by a skilled person, and the receiving unit may be a common known receiver. The transmitting unit and the receiving unit may be integrated in one single unit, for example a transceiver 504. The transceiver or the receiving and the transmitting unit may be adapted to communicate with the base station via an antenna.

The transceiver 504 may be coupled to a configuration unit 505. The configuration unit 505 of the user equipment may be implemented for example as part of a control unit, like a CPU or a microcontroller, or may be implemented as a single unit providing the described functionality. The configuration unit is adapted to configure the user equipment, based on information provided by the first base station in view of the scheduling of the data transmission.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) is not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
110 First cell
111 First base station
112 User equipment
120 Second cell
121 Second base station
200 Cellular network system
215 Micro cell subframes
222 Further user equipment
225 Macro cell subframes
250 Interferences
300 Cellular network system
312 Cell range extension
326 Muted subframes (ABS)
401 PDCCH of macro cell
402 PUSCH of macro cell
403 PDSCH of macro cell
404 Subframe
405 ABS
406 Offset for Uplink
407 PDCCH of micro cell
408 PUSCH of micro cell
409 PDSCH of micro cell
410 Subframe corresponding to ABS
411 PDCCH of micro cell
412 PUSCH of micro cell
413 PDSCH of micro cell
414 Full subframe corresponding to ABS
415 Subframe not-corresponding to ABS
500 Cellular network system
501 Transceiver of base station
502 Determination unit
503 Scheduling unit
504 Transceiver of user equipment
506 Configuration unit of user equipment

The invention claimed is:

1. A method for scheduling a transmission of data via a first communication channel within a first cell of a cellular network, wherein a first base station is assigned to the first cell, and wherein a user equipment is served by the first base station, wherein data between the first base station and the user equipment is transmittable using the first communication channel, wherein the first communication channel is divided into subframes, wherein the cellular network comprises a second base station being assigned to a second cell, wherein the second base station is adapted to use a second communication channel, wherein the second communication channel is divided into subframes, and wherein a part of the second communication channel subframes is unscheduled by the second base station due to a predefined muting pattern, wherein the first communication channel and the second communication channel each comprise a control channel and an uplink channel, the control channel being assigned to downlink communication for allocating uplink communication in the uplink channel the method comprising:

determining, by the first base station, a first plurality of the subframes of the first communication channel being related in time with the unscheduled subframes of the second communication channel, the first plurality of the subframes comprising a first amount being related to the control channel of the first communication channel and a second amount being related to the uplink channel of the first communication channel, wherein the second amount is shifted to the first amount by adding a predetermined offset to the first amount, the predetermined offset depending on a duplex scheme being applied, and scheduling, by the first base station, the transmission of data between the first base station and the user equipment via the first communication channel so that the data is transmitted in the determined first plurality of the subframes.

2. The method as set forth in claim 1, wherein the first communication channel and the second communication channel are at least partially interfering.

3. The method as set forth in claim 1, wherein scheduling the transmission of data comprises scheduling the transmission of data between the first base station and the user equipment via the first communication channel so that the data is transmitted in the determined first amount of the first plurality of the subframes and the determined second amount of the first plurality of the subframes.

4. The method as set forth in claim 1, wherein the first communication channel and the second communication channel each comprise a downlink channel being assigned to downlink communication, wherein the unscheduled subframes of the control channel are related in time with the unscheduled subframes of the downlink channel.

5. The method as set forth in claim 4, wherein determining the first plurality of the subframes comprises determining a third amount of the first plurality of the subframes being related to the downlink channel of the first communication channel.

6. The method as set forth in claim 5, wherein scheduling the transmission of data comprises scheduling the transmission of data between the first base station and the user equipment via the first communication channel so that the data is transmitted in the determined third amount of the first plurality of the subframes.

7. The method as set forth in claim 1, the method further comprises determining a quantity of data to be transmitted.

8. The method as set forth in claim 7, wherein, if the quantity of the data to be transmitted is below a predefined threshold, the data is transmitted in the first plurality of the subframes, and, if, the quantity of the data to be transmitted is above the predefined threshold, the data is transmitted in the first plurality of the subframes and in a second plurality of the subframes being related in time with scheduled subframes of the second communication channel.

9. The method as set forth in claim 7, the method further comprising determining a position of a user equipment, wherein, if the position of the user equipment corresponds to a cell range extension, the data corresponding to the user equipment is transmitted with a higher priority in the first plurality of subframes than the data corresponding to a user equipment being positioned not in the cell range extension.

10. The method as set forth in claim 1, the method further comprising
receiving, by the first base station, the predefined muting pattern from the second base station.

11. A base station for scheduling a transmission of data via a first communication channel within a first cell of a cellular network, wherein the base station is a first base station being assigned to the first cell, and wherein a user equipment is served by the first base station, wherein data between the first base station and the user equipment is transmittable using the first communication channel, wherein the first communication channel is divided into subframes, wherein the cellular network comprises a second base station being assigned to a second cell, wherein the second base station is adapted to use a second communication channel, wherein the second communication channel is divided into subframes, and wherein a part of the second communication channel subframes is unscheduled by the second base station due to a predefined muting pattern, wherein the first communication channel and the second communication channel each comprise a control channel and an uplink channel, the control channel being assigned to downlink communication for allocating uplink communication in the uplink channel,
the base station comprising:
at least one processor; and
at least one non-transitory memory including computer program code,
the at least one memory and the computer program code are configured to, with the at least one processor, cause the base station to:
determine a first plurality of the subframes of the first communication channel being related in time with the unscheduled subframes of the second communication channel, the first plurality of the subframes comprising a first amount being related to the control channel of the first communication channel and a second amount being related to the uplink channel of the first communication channel, wherein the second amount is shifted to the first amount by adding a predetermined offset to the first amount, the predetermined offset depending on a duplex scheme being applied, and
schedule the transmission of data between the first base station and the user equipment via the first communication channel so that the data is transmitted in the determined first plurality of the subframes.

12. A cellular network system, the cellular network system comprising a first cell, wherein a base station as set forth in claim 11 is assigned to the first cell.

13. The base station as set forth in claim 11, wherein the first communication channel and the second communication channel are at least partially interfering.

14. The base station as set forth in 11, wherein scheduling the transmission of data comprises scheduling the transmission of data between the first base station and the user equipment via the first communication channel so that the data is transmitted in the determined first amount of the first plurality of the subframes and the determined second amount of the first plurality of the subframes.

15. The base station as set forth in 11, wherein the first communication channel and the second communication channel each comprise a downlink channel being assigned to downlink communication, wherein the unscheduled subframes of the control channel are related in time with the unscheduled subframes of the downlink channel.

16. The base station as set forth in 15, wherein determining the first plurality of the subframes comprises determining a third amount of the first plurality of the subframes being related to the downlink channel of the first communication channel.

17. The base station as set forth in claim 16, wherein scheduling the transmission of data comprises scheduling the transmission of data between the first base station and the user equipment via the first communication channel so that the data is transmitted in the determined third amount of the first plurality of the subframes.

18. The base station as set forth in claim 11, wherein the at least one memory and the computer program code are configured to, with the at least one processor, cause the base station to:
determine a quantity of data to be transmitted.

19. The base station as set forth in claim 18, wherein, if the quantity of the data to be transmitted is below a predefined threshold, the data is transmitted in the first plurality of the subframes, and, if, the quantity of the data to be transmitted is above the predefined threshold, the data is transmitted in the first plurality of the subframes and in a second plurality of the subframes being related in time with scheduled subframes of the second communication channel.

20. The base station as set forth in claim 18, the method further comprising determining a position of a user equipment, wherein, if the position of the user equipment corresponds to a cell range extension, the data corresponding to the user equipment is transmitted with a higher priority in the first plurality of subframes than the data corresponding to a user equipment being positioned not in the cell range extension.

* * * * *